(12) United States Patent
Iijima et al.

(10) Patent No.: US 12,237,745 B2
(45) Date of Patent: Feb. 25, 2025

(54) STATOR WITH INSULATED TEETH

(71) Applicant: IHI Corporation, Tokyo (JP)

(72) Inventors: Kai Iijima, Tokyo (JP); Yuji Sasaki, Tokyo (JP); Tatsuya Fukui, Tokyo (JP)

(*) Notice: Subject to any disclaimer, the term of this patent is extended or adjusted under 35 U.S.C. 154(b) by 308 days.

(21) Appl. No.: 18/068,749

(22) Filed: Dec. 20, 2022

(65) Prior Publication Data

US 2023/0122181 A1 Apr. 20, 2023

Related U.S. Application Data

(63) Continuation of application No. PCT/JP2021/029183, filed on Aug. 5, 2021.

(30) Foreign Application Priority Data

Aug. 24, 2020 (JP) .................. 2020-140972

(51) Int. Cl.
| | |
|---|---|
| *H02K 3/52* | (2006.01) |
| *H02K 3/24* | (2006.01) |
| *H02K 3/34* | (2006.01) |
| *H02K 3/46* | (2006.01) |
| *H02K 9/22* | (2006.01) |

(52) U.S. Cl.
CPC ......... *H02K 3/522* (2013.01); *H02K 2203/12* (2013.01)

(58) Field of Classification Search
CPC ............ H02K 3/522; H02K 3/24; H02K 3/34; H02K 9/22
USPC ................. 310/49.13, 215, 216.105
See application file for complete search history.

(56) References Cited

U.S. PATENT DOCUMENTS

| 3,339,097 A | * | 8/1967 | Dunn .................... H02K 3/522 310/194 |
| 6,509,665 B1 | | 1/2003 | Nishiyama et al. |
| 2010/0213784 A1 | | 8/2010 | Iizuka et al. |

(Continued)

FOREIGN PATENT DOCUMENTS

| JP | 2001-128402 | 5/2001 |
| JP | 2008-283730 | 11/2008 |

(Continued)

OTHER PUBLICATIONS

International Preliminary Report on Patentability with Written Opinion dated Mar. 9, 2023 for PCT/JP2021/029183.

(Continued)

*Primary Examiner* — Jose A Gonzalez Quinones
(74) *Attorney, Agent, or Firm* — SOEI PATENT & LAW FIRM (57) ABSTRACT

A stator includes: a stator core having an annular shape; teeth that protrudes inwardly in a radial direction from an inner peripheral surface of the stator core; an insulator that covers the teeth; and a winding wound around the teeth with the insulator interposed between the winding and the teeth. The teeth includes: a right surface extending in a first direction along a central axis of the stator core; a left surface extending in the first direction; a top surface that extends between the right surface and the left surface in a second direction intersecting the first direction; a bottom surface that extends between the right surface and the left surface in the second direction; and a through-hole portion penetrating through the teeth from the top surface to the bottom surface.

20 Claims, 4 Drawing Sheets

(56) References Cited

U.S. PATENT DOCUMENTS

2012/0313477 A1* 12/2012 Haga ................. H02K 3/28
  310/215
2013/0313939 A1* 11/2013 Hiramitsu ............. H02K 3/522
  310/195

FOREIGN PATENT DOCUMENTS

| JP | 2010119191 A * | 5/2010 |
| JP | 2010-136571 | 6/2010 |
| JP | 2013-013192 | 1/2013 |

OTHER PUBLICATIONS

International Search Report dated Oct. 26, 2021 for PCT/JP2021/029183.

* cited by examiner

STATOR WITH INSULATED TEETH

CROSS-REFERENCE TO RELATED APPLICATION

This application is a continuation application of PCT Application No. PCT/JP2021/029183, filed Aug. 5, 2021, which claims the benefit of priority from Japanese Patent Application No. 2020-140972, filed on Aug. 24, 2020. the entire contents of which are incorporated herein by reference.

BACKGROUND

The present disclosure relates to a stator.

In an electric motor, a stator has been known which includes a stator core having an annular shape in which a plurality of teeth protrude in a radial direction from an inner peripheral surface of the stator core and are arranged in a circumferential direction; an insulator that covers the teeth; and a winding wound around the teeth with the insulator interposed therebetween. In the electric motor that requires a reduction in size and a high output, a design challenge is to transfer heat from the winding to the stator core and to reduce thermal resistance from the winding to cooling water. Therefore, Japanese Unexamined Patent Publication No. 2001-128402 discloses a stator in which teeth of a stator core is covered with an insulator provided with a hole portion. The hole portion is filled with highly thermally conductive insulating resin. A winding is wound on the insulator and on the highly thermally conductive insulating resin.

In the above-described technique, heat is transferred from the winding to the stator core by the highly thermally conductive insulating resin with which the hole portion is filled. However, since the insulator is provided with the hole portion, rigidity of the insulator and of the stator core decreases.

Therefore, the present disclosure describes a stator in which rigidity of an insulator and of a stator core may be secured while heat is transferred from a winding to the stator core.

SUMMARY

A stator according to one aspect of the present disclosure includes: a stator core having an annular shape in which a plurality of teeth protrude in a radial direction from an inner peripheral surface of the stator core and are arranged in a circumferential direction; an insulator that covers the teeth; and a winding wound around the teeth with the insulator interposed between the winding and the teeth. Each of the teeth includes: a pair of long side surfaces extending in a direction along a central axis of the stator core; a pair of short side surfaces adjacent to the long side surfaces and extending in a direction intersecting the central axis; and a through-hole portion penetrating through the teeth from one short side surface to the other short side surface. The insulator includes: a pair of long side surface-covering portions that cover the pair of respective long side surfaces; a pair of short side surface-covering portions that cover the pair of respective short side surfaces; and a through-hole filling portion with which the through-hole portion is filled. The long side surface-covering portions and the short side surface-covering portions adjacent to each other are integrated with each other. The pair of short side surface-covering portions are integrated with each other through the through-hole filling portion. Each of the long side surface-covering portions includes an opening portion that is open while exposing a respective long side surface. A thermally conductive substance that is more thermally conductive than the insulator is provided on a portion of the long side surface exposed by the opening portion.

According to the stator of one aspect of the present disclosure, rigidity of the insulator and of the stator core may be secured while heat is transferred from the winding to the stator core.

DETAILED DESCRIPTION

A stator according to one aspect of the present disclosure includes: a stator core having an annular shape in which a plurality of teeth protrude in a radial direction from an inner peripheral surface of the stator core and are arranged in a circumferential direction; an insulator that covers the teeth; and a winding wound around the teeth with the insulator interposed between the winding and the teeth. Each of the teeth includes: a pair of long side surfaces extending in a direction along a central axis of the stator core; a pair of short side surfaces adjacent to the long side surfaces and extending in a direction intersecting the central axis; and a through-hole portion penetrating through the teeth from one short side surface to the other short side surface. The insulator includes: a pair of long side surface-covering portions that cover the pair of respective long side surfaces; a pair of short side surface-covering portions that cover the pair of respective short side surfaces; and a through-hole filling portion with which the through-hole portion is filled. The long side surface-covering portions and the short side surface-covering portions adjacent to each other are integrated with each other. The pair of short side surface-covering portions are integrated with each other through the through-hole filling portion. Each of the long side surface-covering portions includes an opening portion that is open while exposing a respective long side surface. A thermally conductive substance that is more thermally conductive than the insulator is provided on a portion of the long side surface exposed by the opening portion.

According to this configuration, a stator according to one aspect of the present disclosure includes: a stator core having an annular shape in which a plurality of teeth protrude in a radial direction from an inner peripheral surface of the stator core and are arranged in a circumferential direction; an insulator that covers the teeth; and a winding wound around the teeth with the insulator interposed between the winding and the teeth. Each of the teeth includes: a pair of long side surfaces extending in a direction along a central axis of the stator core; a pair of short side surfaces adjacent to the long side surfaces and extending in a direction intersecting the central axis; and a through-hole portion penetrating through the teeth from one short side surface to the other short side surface.

The insulator includes: a pair of long side surface-covering portions that cover the pair of respective long side surfaces; a pair of short side surface-covering portions that cover the pair of respective short side surfaces; and a through-hole filling portion with which the through-hole portion is filled. Each of the long side surface-covering portions includes an opening portion that is open while exposing a respective long side surface. A thermally conductive substance that is more thermally conductive than the insulator is provided on a portion of the long side surface exposed by the opening portion.

For this reason, heat is easily transferred from the winding to the stator core. Each of the long side surface-covering portions includes the opening portion. However, the long side surface-covering portions and the short side surface-covering portions adjacent to each other are integrated with each other, and the pair of short side surface-covering portions are integrated with each other through the through-hole filling portion. For this reason, rigidity of the insulator and of the stator core may be secured.

In this case, each of the pair of long side surface-covering portions comprises two opening portions that are open at boundaries with the pair of short side surface-covering portions adjacent to each other such that the short side surface-covering portions and each of the long side surfaces are on the same plane when viewed from the direction along the central axis, and each of the pair of long side surface-covering portions may cover the respective long side surface between the two opening portions.

According to this configuration, each of the pair of long side surface-covering portions includes two opening portions that are open at boundaries with the pair of short side surface-covering portions adjacent to each other such that the short side surface-covering portions and each of the long side surfaces are on the same plane when viewed from the direction along the central axis. For this reason, when the insulator is insert-molded around the teeth of the stator core inserted into a die, an undercut is unlikely to be generated, and manufacturing is facilitated. In addition, since each of the pair of long side surface-covering portions covers the long side surface between the two opening portions, a distance between the teeth and the winding wound around the teeth with the insulator interposed therebetween may be stabilized.

Figure 1:
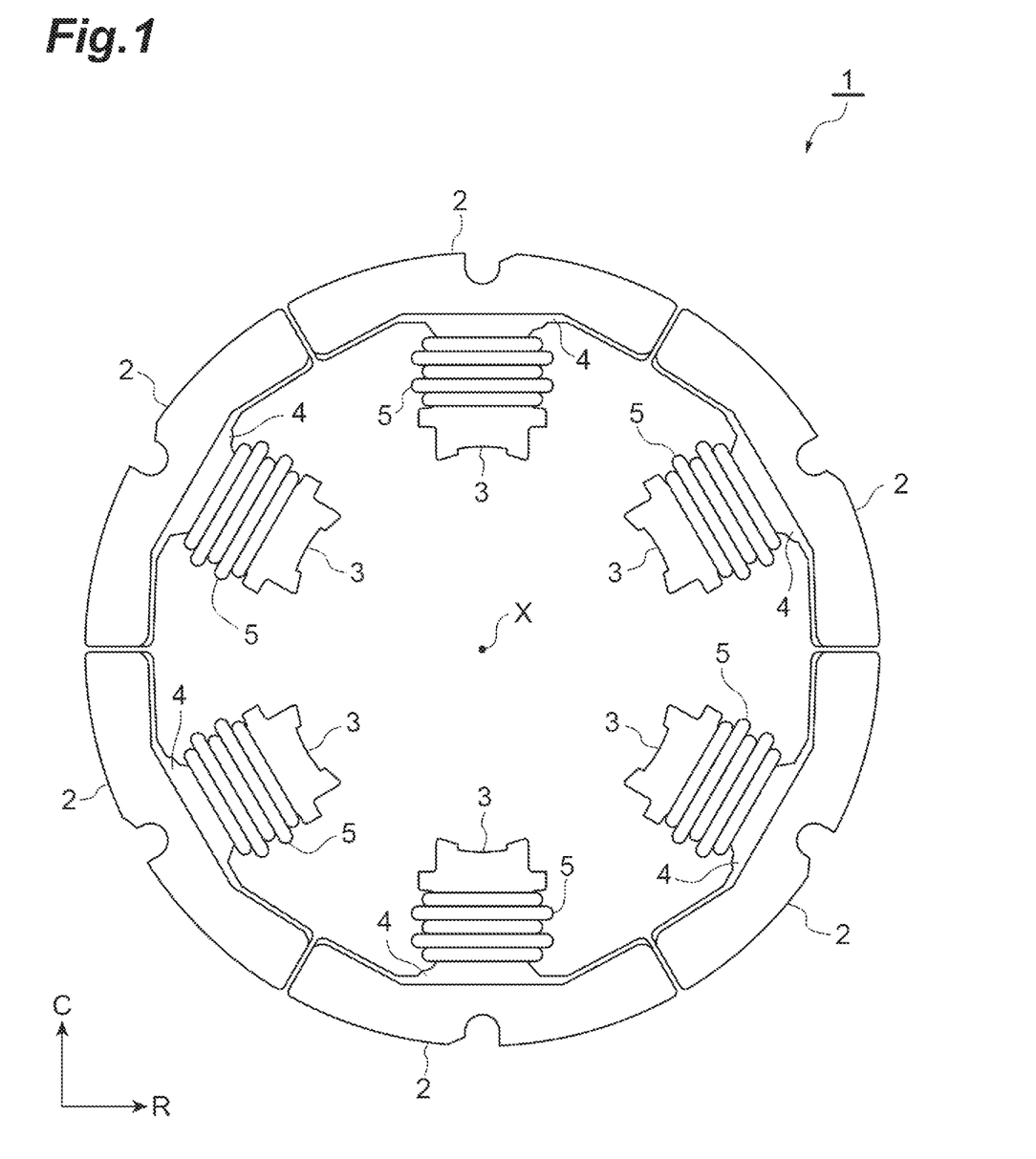
FIG. 1 is a front view of an example stator when viewed from a direction along a central axis.

In the following description, with reference to the drawings, the same reference numbers are assigned to the same components or to similar components having the same function, and overlapping description is omitted. An electric motor including an example stator 1 shown in FIG. 1 is applied to, for example, a two-stage turbocharging system that requires transient response and wide range performance, in a turbocharged engine for a 48V mild hybrid system. The electric motor including the stator 1 according to the present example realizes an electric compressor of the two-stage turbocharging system and an electrically-assisted turbo that regenerates an extra turbine output during high load.

As shown in FIGS. 1, 2A, 2B, 2C, and 3, the stator 1 includes a stator core 2, an insulator 4, and a winding 5. In the stator core 2, a plurality of teeth 3 protrude in a radial direction R from an inner peripheral surface of the stator core 2 having an annular shape, and are arranged in a circumferential direction C. The stator core 2 is divided into a plurality of core pieces in the circumferential direction C, each corresponding to one of the teeth 3. As shown in FIGS. 2A, 2B, 2C, and 3, the stator core 2 includes a plurality of steel plates stacked in a direction along a central axis X of the stator core 2.

The insulator 4 covers the teeth 3. The insulator 4 is a molded part made of synthetic resin. The insulator 4 is formed by an insert molding method in which the insulator 4 is directly molded over the teeth 3 of the stator core 2. The winding 5 is wound around the teeth 3 with the insulator 4 interposed therebetween. The winding 5 is wound around one of the teeth 3 by concentrated winding. The winding 5 is a substantially thick single copper wire having a diameter of approximately several mm to reduce copper loss.

Each of the teeth 3 has a pair of long side surfaces 6 (e.g. right long side surface 6R and left long side surface 6L; right surface and left surface) extending in a direction along the central axis X of the stator core 2. In addition, each of the teeth 3 has a pair of short side surfaces 7 (e.g. top short side surface 7T and bottom short side surface 7B; top surface and bottom surface) that are adjacent to the long side surfaces 6R and 6L and that extend in a direction intersecting the central axis X, namely, in the circumferential direction C. The direction along the central axis X may not be a direction parallel to the central axis X, as long as it is not a direction orthogonal to the central axis X. In addition, the direction intersecting the central axis X may not be the direction orthogonal to the central axis X, as long as it is not a direction parallel to the central axis X. In addition, the direction in which each of the long side surfaces 6R and 6L and the short side surfaces 7T and 7B extends may be the same over the entirety thereof or may vary depending on the position thereon.

Figure 4A:
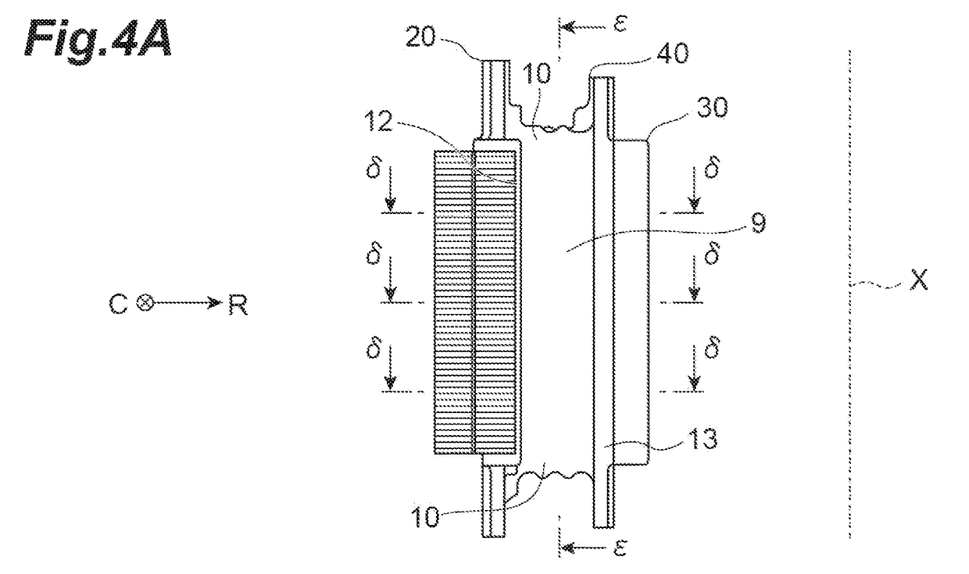
FIG. 4A is a side view of a stator core of a comparative stator when viewed from a circumferential direction.
Figure 4B:
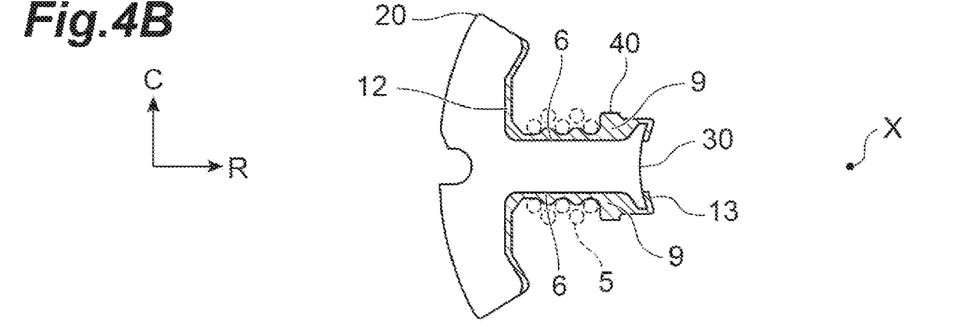
FIG. 4B is a cross-sectional view taken along line δ of FIG. 4A.
Figure 4C:
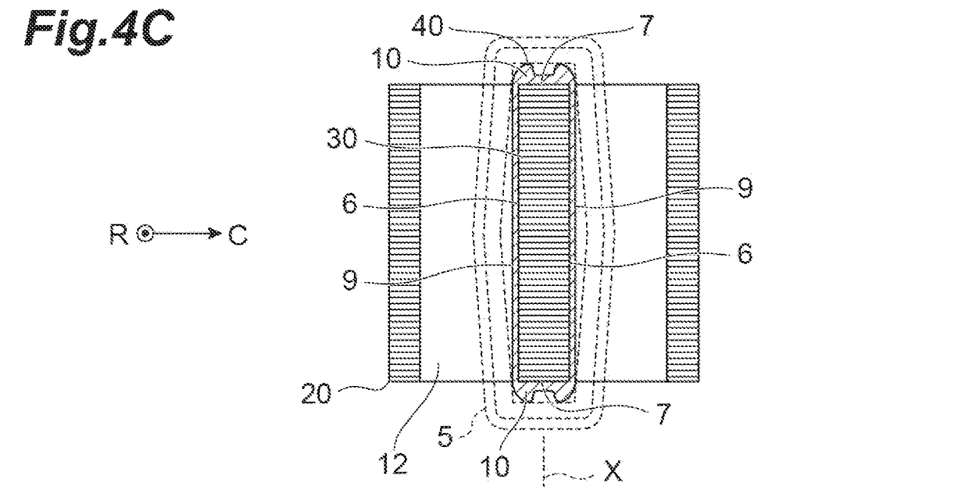
FIG. 4C is a cross-sectional view taken along line ε of FIG. 4A.

Each of the teeth 3 includes a through-hole portion 8 penetrating therethrough from one short side surface 7T to the other short side surface 7B. In the present example, in order to regain a volume of each of the teeth 3 reduced by providing the through-hole portion 8, a width of each of the teeth 3 in the circumferential direction C is wider by a width of the through-hole portion 8 in the circumferential direction C than that of each of teeth 30 of a comparative stator core 20 as shown in FIGS. 4A, 4B, and 4C. In addition, as shown in FIGS. 2B and 2C, each of the teeth 3 of the present example includes a reduced width portion 16 in the vicinity of a tip portion of the inner peripheral surface of the stator core 2. A width of the reduced width portion 16 in the circumferential direction C is reduced from the inside of the stator core 2 to the outside of the stator core 2 (e.g., reduced in a direction from a side of inner circumference of the stator core 2 to a side of outer circumference of the stator core 2). In addition, each of the teeth 3 of the present example includes an increased width portion 17 which is provided on the outside of the stator core 2 with respect to the reduced width portion 16. A width of the increased width portion 17 in the circumferential direction C is increased from the inside of the stator core 2 to the outside of the stator core 2 (e.g., increased in a direction from a side of inner circumference of the stator core 2 to a side of outer circumference of the stator core 2). Namely, in each of the teeth 3 of the present example, a constriction (e.g. neck) is formed in the vicinity of the tip portion when viewed from the direction along the central axis X of the stator core 2. In addition, the through-hole portion 8 is formed closer to the outer circumference of the stator core 2 than the reduced width portion 16.

As shown in FIGS. 2A, 2B, 2C, and 3, the insulator 4 includes a pair of long side surface-covering portions 9 (e.g. right long side surface-covering portion 9R and left long side surface-covering portion 9L; right insulating portion and left insulating portion) that cover the pair of respective long side surfaces 6 (e.g. the right long side surface-covering portion 9R covers the right long side surface 6R and the left long side surface-covering portion 9L covers the left long side surface 6L). In addition, the insulator 4 includes a pair of short side surface-covering portions 10 (e.g. top short side surface-covering portion 10T and bottom short side surface-covering portion 10B) that cover the pair of respective short side surfaces 7 (e.g. the top short side surface-covering portion 10T covers the top short side surface 7T and the bottom short side surface-covering portion 10B covers the bottom short side surface 7B). In addition, the insulator 4 includes a through-hole filling portion 11 with which the through-hole portion 8 is filled. Further, the insulator 4 includes a base portion-covering portion 12 (base insulating portion) that covers a base portion of each of the teeth 3, and a tip portion-covering portion 13 (tip insulating portion) that covers the tip portion of each of the teeth 3.

Figure 2A:
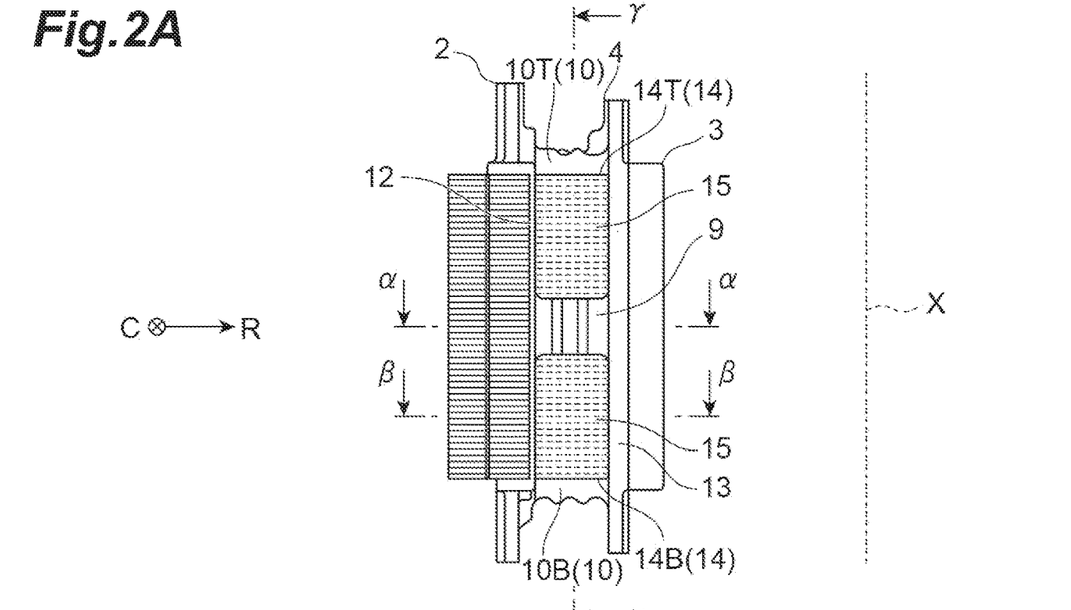
FIG. 2A is a side view of an example stator core when viewed from a circumferential direction.
Figure 2B:
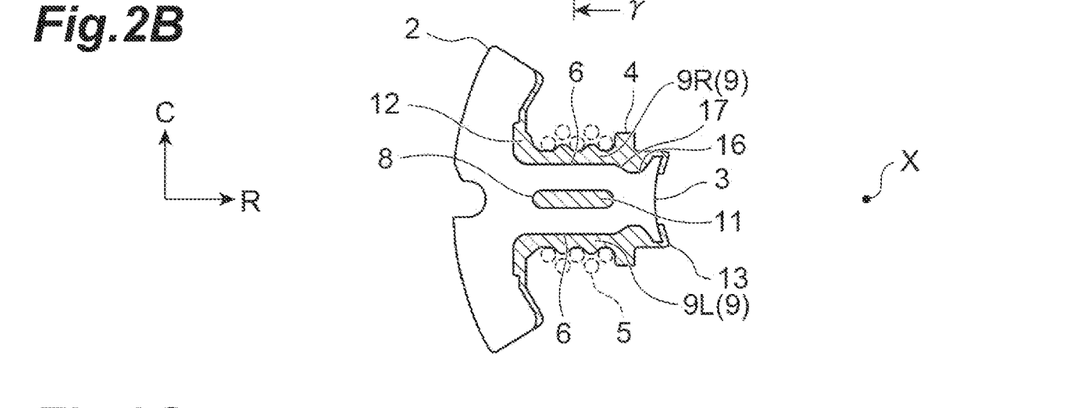
FIG. 2B is a cross-sectional view taken along line α of FIG. 2A.
Figure 2C:
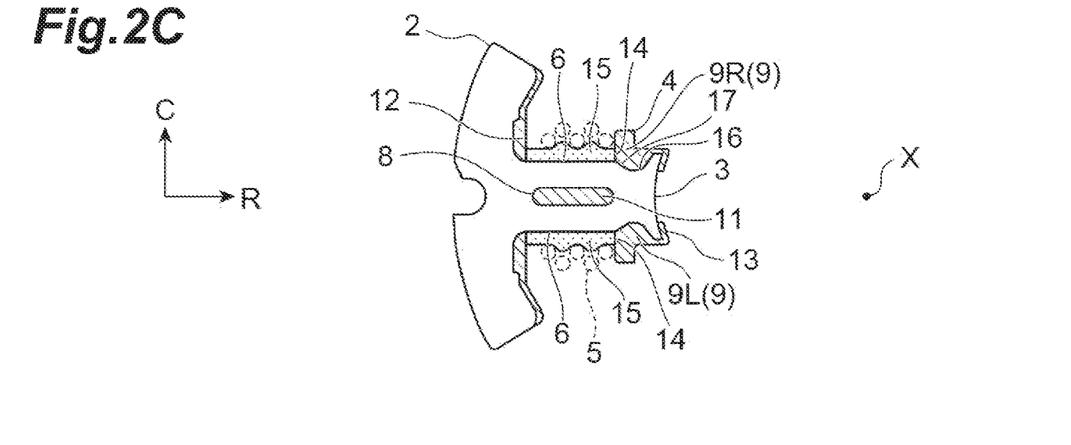
FIG. 2C is a cross-sectional view taken along line β of FIG. 2A.
Figure 3:
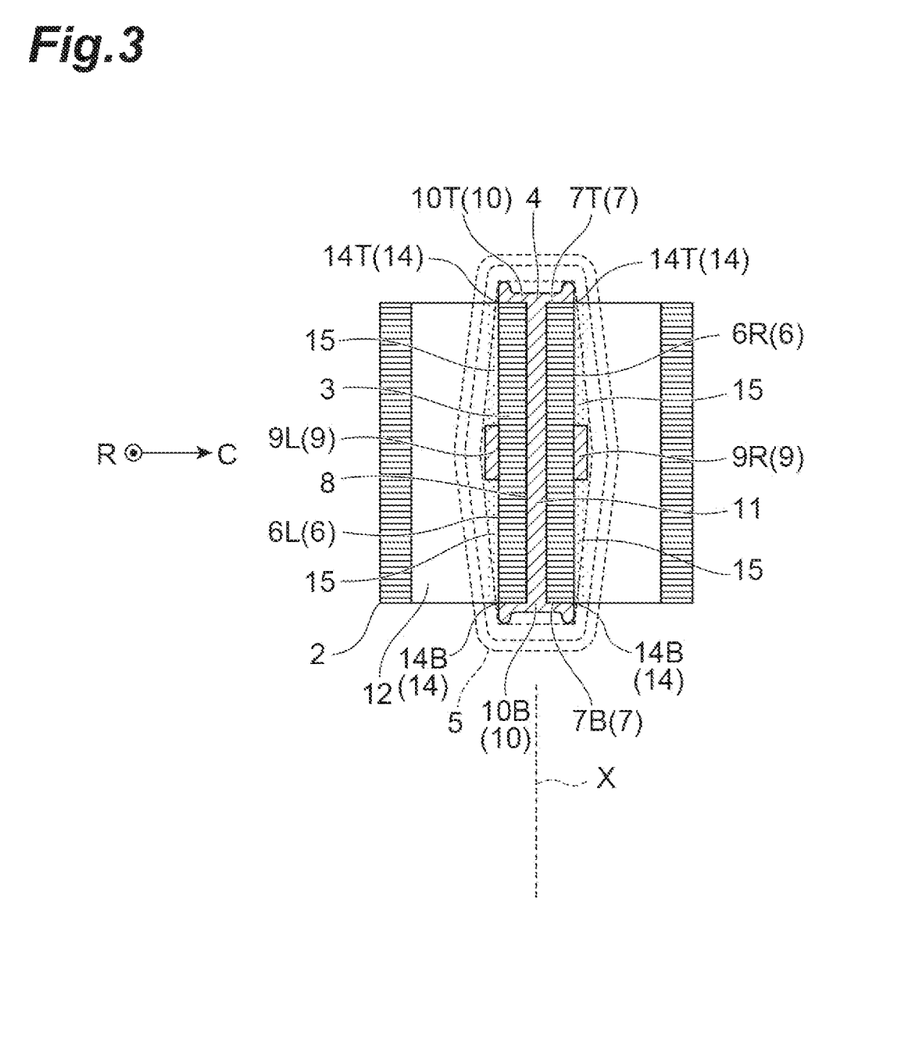
FIG. 3 is a cross-sectional view taken along line γ of FIG. 2A.

As shown in FIG. 2A, the long side surface-covering portions 9 and the short side surface-covering portions 10 adjacent to each other are integrated with each other through the base portion-covering portion 12 and through the tip portion-covering portion 13. As shown in FIG. 3, the pair of short side surface-covering portions 10 are integrated with each other through the through-hole filling portion 11. As shown in FIGS. 2A, 2C, and 3, each of the long side surface-covering portions 9R and 9L includes two opening portions 14 (e.g. top opening portion 14T and bottom opening portion 14B) those are open while exposing the long side surfaces 6R and 6L partially. Six openings are formed in the insulator 4 of the present example. Four of the six openings are two opening portions 14T and 14B which expose the long side surface 6R and two opening portions 14T and 14B which expose the long side surface 6L. One of the six openings is an opening that exposes a part of the tip portion of each of the teeth 3 at the tip portion-covering portion 13. The last one of the six openings opens on a side of the outer circumference of the stator core 2 along a shape of the base portion of each of the teeth 3 at the base portion-covering portion 12 when it is assumed that there is no stator core 2.

As shown in FIG. 3, each of the pair of long side surface-covering portions 9R and 9L includes two opening portions 14T and 14B that are open at boundaries with the pair of short side surface-covering portions 10T and 10B adjacent to the pair of long side surface-covering portions 9R and 9L such that the short side surface-covering portions 10T and 10B and each of the long side surfaces 6R and 6L are on the same plane when viewed from the direction along the central axis X. The top opening 14T exposes the right long side surface 6R from a top end to a middle portion. The bottom opening 14B exposes the right long side surface 6R from a bottom end to the middle portion. The top opening 14T exposes the left long side surface 6L from a top end to a middle portion. The bottom opening 14B exposes the left long side surface 6L from a bottom end to the middle portion. As shown in FIGS. 2A, 2B, and 3, each of the pair of long side surface-covering portions 9R and 9L covers the long side surface 6R and 6L respectively between the two opening portions 14. The right long side surface-covering portion 9R covers the right long side surface 6R at the middle portion. The left long side surface-covering portion 9L covers the left long side surface 6L at the middle portion. The short side surface-covering portions 10T and 10B have a sufficient thickness such that the winding 5 which is substantially thick and difficult to bend is not in contact with the long side surfaces 6R and 6L exposed at the opening portions 14. The short side surface-covering portions 10T and 10B are formed without an opening.

As shown in FIGS. 2A, 2C, and 3, a thermally conductive substance 15 that is more thermally conductive than the insulator 4 is provided on portions of each of the long side surfaces 6R and 6L exposed by the opening portions 14T and 14B. The thermally conductive substance 15 is a paste-like thermally conductive compound such as silicone grease. The thermally conductive substance 15 is provided on the portions of each of the long side surfaces 6R and 6L exposed by the opening portions 14T and 14B, by applying the paste-like thermally conductive compound to the opening portions 14T and 14B.

Generally, a thermal conductivity of the insulator 4 is approximately 0.3 to 0.5 W/mK. On the other hand, a thermal conductivity of the thermally conductive substance 15 is approximately 2 W/mK. When the winding 5 is wound around each of the teeth 3, the thermally conductive substance 15 is crushed by the winding 5. A space between the winding 5 and each of the teeth 3 of the stator core 2 is filled with the thermally conductive substance 15, so that heat is more easily transferred from the winding 5 to the stator core 2.

As shown in FIGS. 2C and 3, only a space between a first layer of the winding 5 wound in a plurality of layers and each of the teeth 3 may be filled with the thermally conductive substance 15. Since the winding 5 that is substantially thick and difficult to bend, the first layer of the winding 5 wound in the plurality of layers does not cover (e.g. follow) each of the teeth 3 and the insulator 4 over the entire circumference. For this reason, the space between at least the first layer of the winding 5 and each of the teeth 3 may be filled with the thermally conductive substance 15.

On the other hand, since winding radiuses of the winding 5 in second and subsequent layers are definitely larger than the radius of the first layer over the entire circumference, the winding 5 of the first layer and the winding 5 of the second and subsequent layers are in close contact with each other. When the turns of the winding 5 are in contact with each other, heat is easily transferred between the turns of the winding 5. For this reason, only the space between the first layer of the winding 5 wound in the plurality of layers and each of the teeth 3 may be filled with the thermally conductive substance 15.

In the above-described electric motor including the stator 1 according to the present example, an output of an ordinary turbocharger with a similar size is approximately 4.5 kW to 8 kW, so that water cooling may be basically applied. Since a centrifugal compressor is involved, the electric motor is driven at an ultra-high speed (a maximum speed of 80 k rpm for an electric compressor and a maximum speed of 200 k rpm for an electrically-assisted turbo), and low inductance design is applied to drive the electric motor with 48 V. Since this means a reduction in magnet torque, an amount of the electric current for generating the foregoing output is as large as approximately 150 A at its maximum. Therefore, copper loss is a main loss of the electric motor from which heat has to be removed. Since an allowable temperature of the winding is limited to approximately 180° C. to realize an economical electric motor, a design challenge is to reduce thermal resistance from the winding to cooling water.

Generally, in such an electric motor with a small size and a high output, a contact area between the winding and the stator core is increased and thermal resistance is lowered by winding the winding around the stator core and then by pouring and curing a casting resin having a high fluidity such as epoxy resin or silicone of which thermal conductivity is increased. However, in this method, a large amount (100 g or more) of the casting resin that is expensive is used, and a curing time (approximately 30 to 60 minutes in the case of thermal curing) is needed. For this reason, the cost for components increases.

As a simpler method, for example, as in Japanese Unexamined Patent Publication No. 2001-128402, it is proposed that a part of the insulator that covers the stator core is made of an insulating resin with a high thermal conductivity. In addition, a method is proposed in which the insulator is divided into two pieces in the direction along the central axis and the long side surfaces are replaced with thermally conductive sheets. However, in both of the proposals, since a hole portion is provided in a part of the insulator or the insulator itself is separated from the stator core, the rigidity of the stator core and the insulator decrease.

In FIGS. 4A, 4B, and 4C, the degree of close contact between an insulator 40 and the stator core 20 is increased by the insert molding method in which the insulator 40 is directly molded over the teeth 30 of the stator core 20. In this method, since insert molding resin of the insulator 40 increases rigidity of the stator core 20, the winding 5 may be wound around the teeth 30 with high tension. For this reason, a substantially thick single copper wire may be employed as the winding 5, and reliability of a connection portion of the winding 5 may be improved while handling a large electric current.

However, since the winding 5 that is substantially thick and wound around the teeth 30 is difficult to bend and has difficulty in covering (e.g., following) the teeth 30 and the insulator 40, as shown in FIG. 4C, the winding 5 and the insulator 40 are in close contact with each other only in the vicinity of the boundaries between the long side surface-covering portions 9 and the short side surface-covering portions 10, and contact therebetween at other portions is not obtained. For this reason, heat transfer from the winding 5 to the stator core 20 becomes difficult, and heat removal capability is insufficient.

On the other hand, as shown in FIGS. 1, 2A, 2B, 2C, and 3, in the present example, in the stator 1 including the stator core 2 having an annular shape in which the plurality of teeth 3 protrude in the radial direction R from the inner peripheral surface of the stator core 2 and are arranged in the circumferential direction C; the insulator 4 that covers the teeth 3; and the winding 5 wound around the teeth 3 with the insulator 4 interposed between the winding 5 and the teeth 3, each of the teeth 3 has the pair of long side surfaces 6R and 6L extending in the direction along the central axis X of the stator core 2, the pair of short side surfaces 7T and 7B extending in the direction intersecting the central axis X, and the through-hole portion 8 penetrating through each of the teeth 3 from one short side surface 7T to the other short side surface 7B.

The insulator 4 includes the pair of long side surface-covering portions 9R and 9L that cover the pair of respective long side surfaces 6R and 6L, the pair of short side surface-covering portions 10T and 10B that cover the pair of respective short side surfaces 7T and 7B, and the through-hole filling portion 11 with which the through-hole portion 8 is filled. Each of the long side surface-covering portions 9R and 9L includes two opening portions 14T and 14B those are open while exposing the long side surface 6R and 6L partially. The thermally conductive substance 15 that is more thermally conductive than the insulator 4 is provided on a portion of each of the long side surfaces 6R and 6L exposed by the opening portions 14T and 14B.

For this reason, heat is transferred from the winding 5 to the stator core 2. Each of the long side surface-covering portions 9R and 9L includes two opening portions 14T and 14B. However, the long side surface-covering portions 9R and 9L and the short side surface-covering portions 10T and 10B adjacent to each other are integrated with each other, and the pair of short side surface-covering portions 10T and 10B are integrated with each other through the through-hole filling portion 11. For this reason, rigidity of the insulator 4 and of the stator core 2 may be secured.

The resin clings to the teeth 3 due to molding shrinkage of the resin, so that the rigidity of the insulator 4 is maintained. When the insulator 4 surrounds the entire periphery of the teeth 3, the insulator 4 has a closed cross section, and the rigidity of the insulator 4 becomes the rigidity of the teeth 3 itself, so that the rigidity is maximized.

On the other hand, when a hole portion is drilled in the long side surfaces 6, the hole portion opens on the entirety of the long side surfaces 6 of the teeth 3 due to restrictions on molding (die removal), so that the insulator 4 clings to the teeth 3 only through the short side surfaces 7. Therefore, the amount of the material supporting the insulator 4 in the vicinity of the boundaries between the long side surface-covering portions 9 and the short side surface-covering portions 10 is minimized, and the rigidity decreases.

However, in the present example, the through-hole portion 8 is provided inside the stator core 2 (the teeth 3), and the short side surface-covering portions 10T and 10B located on the short side surfaces 7 of the teeth 3 are connected to each other by the resin of the through-hole filling portion 11 with which the through-hole portion 8 is filled, so that the insulator 4 clings to the teeth 3 with such a surface area that enables the insulator 4 to surround the periphery of the teeth 3, so that the rigidity may be relatively well maintained.

As described above, since the winding 5 that is substantially thick is difficult to bend and has difficulty in covering (following) the teeth 3 and the insulator 4, the winding 5 and the insulator 4 are in close contact with each other only in the vicinity of the boundaries between the long side surface-covering portions 9R and 9L and the short side surface-covering portions 10T and 10B. Therefore, when the insulator 4 is in contact with the winding 5 only in the vicinity of the boundaries, the insulator 4 at locations other than the vicinity of the boundaries is removed, and the space between the teeth 3 and the winding 5 is filled with the thermally conductive substance, so that heat may be transferred from the winding 5 to the stator core 2.

In addition, according to the present example, each of the pair of long side surface-covering portions 9R and 9L includes the two opening portions 14T and 14B that are open at the boundaries with the pair of short side surface-covering portions 10T and 10B adjacent to each other such that the short side surface-covering portions 10 and each of the long side surfaces 6 are on the same plane when viewed from the direction along the central axis X. (e.g., the short side surface-covering portion 10T and the long side surfaces 6R are on the same plane when viewed from the radial direction R; the short side surface-covering portion 10T and the long side surfaces 6L are on the same plane when viewed from the radial direction R; the short side surface-covering portion 10B and the long side surfaces 6R are on the same plane when viewed from the radial direction R; the short side surface-covering portion 10B and the long side surfaces 6L are on the same plane when viewed from the radial direction R). For this reason, when the insulator 4 is insert-molded around the teeth 3 inserted into a die, an undercut may be unlikely to be generated, and manufacturing may be facilitated. In addition, since each of the pair of long side surface-covering portions 9R and 9L covers the long side surface 6R and 6L between the two opening portions 14T and 14B, a distance between the teeth 3 and the winding 5 wounds around the teeth 3 with the insulator 4 interposed therebetween may be stabilized.

Namely, when the insulator 4 is molded over the teeth 3 by insert molding, in consideration of that a division direction of the molding die is the direction along the central axis X, in order to prevent an undercut from being generated, the opening portions 14 may be open such that the short side surface-covering portions 10 and each of the long side surfaces 6 are on the same plane when viewed from the direction along the central axis X. In this case, the proximity of the winding 5 and the long side surfaces 6 may be considered.

Therefore, in the present example, the opening portions 14 are disposed only at locations where the winding 5 is not in contact with the teeth 3. The insulator 4 is molded on the short side surfaces 7T and 7B and central portions of the long side surfaces 6R and 6L. Accordingly, as shown in FIG. 3, since the winding 5 is wound around the teeth 3 in a hexagonal shape or in an octagonal shape when viewed from the radial direction R, the distance between the teeth 3 and the winding 5 is stabilized. In addition, since the winding 5 is pressed against the teeth 3 by tension, the amount of use of the thermally conductive substance 15 is reduced, and the ease of heat transfer is stabilized.

Further, in the present example, since the winding 5 that is substantially thick is difficult to bend, while guiding the bending of the winding 5 to the middle, a thickness margin is provided with respect to each of the short side surfaces 7 of the teeth 3 at the opening portions 14 that are undercut removal portions, so that the winding of the winding 5 around the teeth 3 may be stabilized while avoiding contact between the winding 5 and the long side surfaces 6 of the teeth 3.

It is to be understood that not all aspects, advantages and features described herein may necessarily be achieved by, or included in, any one particular example. Indeed, having described and illustrated various examples herein, it should be apparent that other examples may be modified in arrangement and detail. For example, the thermally conductive substance 15 may be a sheet-shaped thermal conductor sandwiched between the winding 5 and the teeth 3, instead of being a thermally conductive compound. In addition, the thermally conductive substance 15 may be a molding material (potting material) with which the entirety of the electric motor including the opening portions 14 is filled.

The invention claimed is:

1. A stator comprising:
a stator core having an annular shape in which a plurality of teeth protrude in a radial direction from an inner peripheral surface of the stator core and are arranged in a circumferential direction;
an insulator that covers the teeth; and
a winding wound around the teeth with the insulator interposed between the winding and the teeth,
wherein each of the teeth comprises:
a pair of long side surfaces extending in a direction along a central axis of the stator core;
a pair of short side surfaces adjacent to the long side surfaces and extending in a direction intersecting the central axis; and
a through-hole portion penetrating through the teeth from one short side surface to the other short side surface,
wherein the insulator comprises:
a pair of long side surface-covering portions that cover the pair of respective long side surfaces;
a pair of short side surface-covering portions that cover the pair of respective short side surfaces; and
a through-hole filling portion with which the through-hole portion is filled,
wherein the long side surface-covering portions and the short side surface-covering portions adjacent to each other are integrated with each other,
wherein the pair of short side surface-covering portions are integrated with each other through the through-hole filling portion,
wherein each of the long side surface-covering portions comprises an opening portion that is open while exposing a respective long side surface, and
wherein a thermally conductive substance that is more thermally conductive than the insulator is provided on a portion of the long side surface exposed by the opening portion.

2. The stator according to claim 1,
wherein each of the pair of long side surface-covering portions comprises two opening portions that are open at boundaries with the pair of short side surface-covering portions adjacent to each other such that the short side surface-covering portions and each of the long side surfaces are on the same plane when viewed from the direction along the central axis, and
wherein each of the pair of long side surface-covering portions covers the respective long side surface between the two opening portions.

3. A stator comprising:
a stator core having an annular shape;
teeth that protrudes inwardly in a radial direction from an inner peripheral surface of the stator core;
an insulator that covers the teeth; and
a winding wound around the teeth with the insulator interposed between the winding and the teeth,
wherein the teeth comprise:
a right surface extending in a first direction along a central axis of the stator core;
a left surface extending in the first direction;
a top surface that extends between the right surface and the left surface in a second direction intersecting the first direction;
a bottom surface that extends between the right surface and the left surface in the second direction; and
a through-hole portion penetrating through the teeth from the top surface to the bottom surface.

4. The stator according to claim 3,
wherein the insulator comprises:
a right insulating portion that covers the right surface and extends in the first direction;
a left insulating portion that covers the left surface and extends in the first direction;
a top insulating portion that covers the top surface and extends in the second direction;
a bottom insulating portion that covers the bottom surface and extends in the second direction; and
a through-hole filling portion with which the through-hole portion is filled.

5. The stator according to claim 4,
wherein the right insulating portion, the top insulating portion and the bottom insulating portion are integrated with each other.
6. The stator according to claim 5,
wherein the teeth further comprise a base and a tip,
wherein the insulator further comprises a base insulating portion that covers the base of the teeth and a tip insulating portion that covers the tip of the teeth, and
wherein the right insulating portion, the top insulating portion, the bottom insulating portion, the base insulating portion and the tip insulating portion are directly molded over the teeth by an insert molding method, so as that the right insulating portion, the top insulating portion and the bottom insulating portion are integrated with each other through the base insulating portion and the tip insulating portion.
7. The stator according to claim 4,
wherein the right insulating portion, the left insulating portion, the top insulating portion and the bottom insulating portion are integrated with each other.
8. The stator according to claim 4,
wherein the top insulating portion and the bottom insulating portion are integrated with each other.
9. The stator according to claim 8,
wherein the top insulating portion, the bottom insulating portion and the through-hole filling portion are directly molded over the teeth by an insert molding method, so as that the top insulating portion and the bottom insulating portion are integrated with each other through the through-hole filling portion.
10. The stator according to claim 4,
wherein the right insulating portion comprises an opening that exposes a part of the right surface, and
wherein the left insulating portion comprises an opening that exposes a part of the left surface.
11. The stator according to claim 10,
wherein the right insulating portion comprises a top opening and a bottom opening,
wherein the top opening exposes a top part of the right surface, and
wherein the bottom opening exposes a bottom part of the right surface.
12. The stator according to claim 11,
wherein the top opening exposes the right surface from a top end to a middle portion,
wherein the bottom opening exposes the right surface from a bottom end to the middle portion, and
wherein the right insulating portion covers the right surface at the middle portion.

13. The stator according to claim 10,
wherein the left insulating portion comprises a top opening and a bottom opening,
wherein the top opening exposes a top part of the left surface, and
wherein the bottom opening exposes a bottom part of the left surface.
14. The stator according to claim 10,
wherein the top insulating portion and the bottom insulating portion are formed without an opening.
15. The stator according to claim 4,
wherein the teeth further comprise a tip,
wherein the insulator further comprises a tip insulating portion that covers the tip of the teeth, and
wherein the tip insulating portion comprises a tip opening that exposes a part of the tip.
16. The stator according to claim 10,
wherein a thermally conductive substance that is more thermally conductive than the insulator is provided on a portion of the right surface exposed by the opening of the right insulating portion, and on a portion of the left surface exposed by the opening of the left insulating portion.
17. The stator according to claim 16,
wherein the insulator is formed by a synthetic resin and the thermally conductive substance is formed by a paste-like thermally conductive compound.
18. The stator according to claim 17,
wherein the paste-like thermally conductive compound is formed by a silicone grease.
19. The stator according to claim 4,
wherein the teeth further comprise a constriction formed in a vicinity of a tip of the teeth, and
wherein the constriction comprises:
    a reduced width portion formed in the vicinity of the tip of the teeth, wherein a width of the reduced width portion in a circumferential direction of the stator core is reduced from an inside of the stator core to an outside of the stator core; and
    an increased width portion formed on the outside of the stator core with respect to the reduced width portion, wherein a width of the increased width portion in the circumferential direction is increased from the inside of the stator core to the outside of the stator core.
20. The stator according to claim 19,
wherein the through-hole portion is formed closer to an outer circumference of the stator core than the constriction.

* * * * *